United States Patent
Schrom et al.

(10) Patent No.: US 7,274,181 B2
(45) Date of Patent: Sep. 25, 2007

(54) SYSTEMS, MULTIPHASE POWER CONVERTERS WITH DROOP-CONTROL CIRCUITRY AND METHODS

(75) Inventors: Gerhard Schrom, Hillsboro, OR (US); Peter Hazucha, Beaverton, OR (US); Vivek K. De, Beaverton, OR (US); Tanay Karnik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 10/877,939

(22) Filed: Jun. 25, 2004

(65) Prior Publication Data

US 2005/0286280 A1 Dec. 29, 2005

(51) Int. Cl.
*G05F 1/40* (2006.01)
*G05F 1/10* (2006.01)

(52) U.S. Cl. .................. 323/284; 323/237; 323/241
(58) Field of Classification Search .......... 363/65–70; 323/222, 225, 237, 241, 283, 284, 290, 246
See application file for complete search history.

(56) References Cited

U.S. PATENT DOCUMENTS 6,605,931 B2 * 8/2003 Brooks .................... 323/284
6,703,812 B1 * 3/2004 Lethellier .................. 323/222

\* cited by examiner

*Primary Examiner*—Jessica Han
(74) *Attorney, Agent, or Firm*—Schwegman, Lundberg & Woessner, P.A.

(57) ABSTRACT

Droop-control circuitry of a multiphase power converter determines when multiphase switching signals are concurrently at either a high or low state and temporarily clamps the output of the power converter to either a high or low voltage level in response thereto.

23 Claims, 6 Drawing Sheets

MULTIPHASE POWER CONVERTER WITH DROOP CONTROL

FIG. 1

MULTIPHASE SWITCHING SIGNALS

*FIG. 3*

DROOP CONTROL CIRCUITRY

SYSTEMS, MULTIPHASE POWER CONVERTERS WITH DROOP-CONTROL CIRCUITRY AND METHODS

TECHNICAL FIELD

Embodiments of the present invention pertain to power converters and power supplies, and in some embodiments, to on-die power supplies.

BACKGROUND

In many modern processing systems, DC-to-DC multiphase switching power converters are used because of their relatively high efficiency. In more and more applications, these power converters are required to maintain their output voltage within an increasingly tighter range over a wide range of load conditions. Some conventional systems use larger output capacitance to help maintain the output voltage. Other conventional systems increase the operating frequency of the power converter.

One problem with the use of larger output capacitance, especially for on-chip power converters, is that large capacitances consume excessive area, significantly increasing cost. The use of off-chip capacitances results in increased resistance and inductance. On the other hand, increasing the operating frequency reduces the efficiency of the power converter due to increased switching losses.

Thus there are general needs for higher-efficiency power converters that may better maintain output voltage over a wide range of load conditions.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention may be referred to, individually or collectively, herein by the term "invention" merely for convenience and without intending to voluntarily limit the scope of this application to any single invention or inventive concept if more than one is in fact disclosed.

Figure 1:
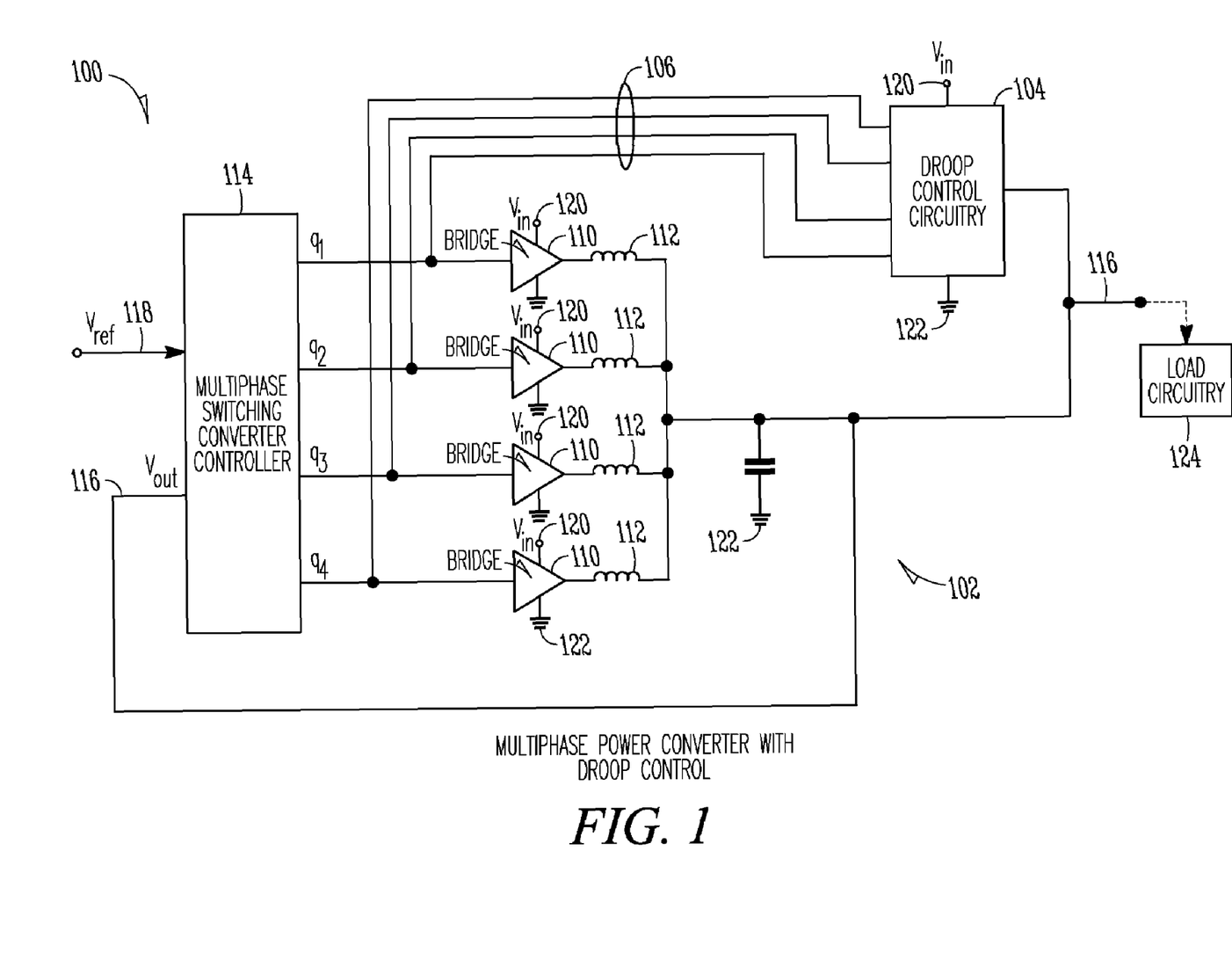
FIG. 1 is a circuit diagram of a multiphase power converter in accordance with some embodiments of the present invention.

FIG. 1 is a circuit diagram of a multiphase power converter in accordance with some embodiments of the present invention. Multiphase power converter 100 comprises multiphase power converter circuitry 102 and droop-control circuitry 104. In some embodiments, droop-control circuitry 104 determines when multiphase switching signals 106 are concurrently at either a high or low state and temporarily clamps output 116 of the power converter to either a high or low voltage level in response thereto.

In some embodiments, multiphase power converter circuitry 102 may comprise a plurality of bridge circuits 110 to cumulatively generate output 116 from input voltage 120 in response to multiphase switching signals 106. Multiphase power converter circuitry 102 may also comprise multiphase controller 114 to generate multiphase switching signals 106 and to control a duty cycle of multiphase switching signals 106 based on output 116 and reference voltage 118. In some embodiments, a higher number of the multiphase switching signals 106 may concurrently be at a first state (e.g., high) when the duty cycle is increased, and a higher number of multiphase switching signals 106 may concurrently be at a second state (e.g., low) when the duty cycle is decreased.

In some embodiments, an increase in the duty cycle may indicate a voltage undershoot condition (i.e., a drop in the output voltage) and may result in an increase in the number multiphase switching signals having a high state. In some embodiments, a decrease in the duty cycle may indicate a voltage overshoot condition (i.e., an increase of the output voltage) and may cause an increase in the number of multiphase switching signals having a low state. During a voltage undershoot condition, droop-control circuitry 104 may temporarily increase the output voltage by clamping the output to a higher voltage level, while during a voltage overshoot condition, droop-control circuitry 104 may temporarily decrease the output voltage by clamping the output to a lower voltage level.

In some embodiments, each of bridge circuits 110 may be coupled with an associated output inductor 112 to cumulatively generate output 116. In some embodiments, each of bridge circuits 110 and the associated output inductor 112 comprise a Buck converter, although the scope of the invention is not limited in this respect. Other power converter topologies, such as converters using coupled inductors or transformers, as well as boost and buck-boost converters, may also be suitable.

In some embodiments, droop-control circuitry 104 may comprise voltage-undershoot detection circuitry for determining when a first number of multiphase switching signals 106 is at a first state, and voltage-overshoot detection circuitry for determining when a second number of multiphase switching signals 106 is at a second state. In these embodiments, droop-control circuitry 104 may also comprise clamping circuitry to clamp output 116 to either a high or low voltage level in response to the detection circuitries. In some embodiments, the high voltage level may correspond to input voltage 120 and the low voltage level may correspond to ground 122, although the scope of the invention is not limited in this respect.

In some embodiments, droop-control circuitry 104 may temporarily clamp output 116 to input voltage 120 while at least the first predetermined number of multiphase switching signals 106 remains at the first state. In these embodiments, droop-control circuitry 104 may otherwise temporarily clamp output 116 to ground 122 while at least the second predetermined number of multiphase switching signals 106 remains at the second state. In some embodiments, droop-control circuitry 104 may count a number of multiphase switching signals 106 that are concurrently at the first state, and may count a number of multiphase switching signals 106 that are concurrently at the second state.

Load circuitry 124 may be an on-die or off-die load, and may include one or more processors as well as other circuitry that consume current, although the scope of the invention is not limited in this respect. In some embodiments, load circuitry 124 may comprise one or more elements of a wireless communication device, such as a transceiver, although the scope of the invention is not limited in this respect.

Figure 2:
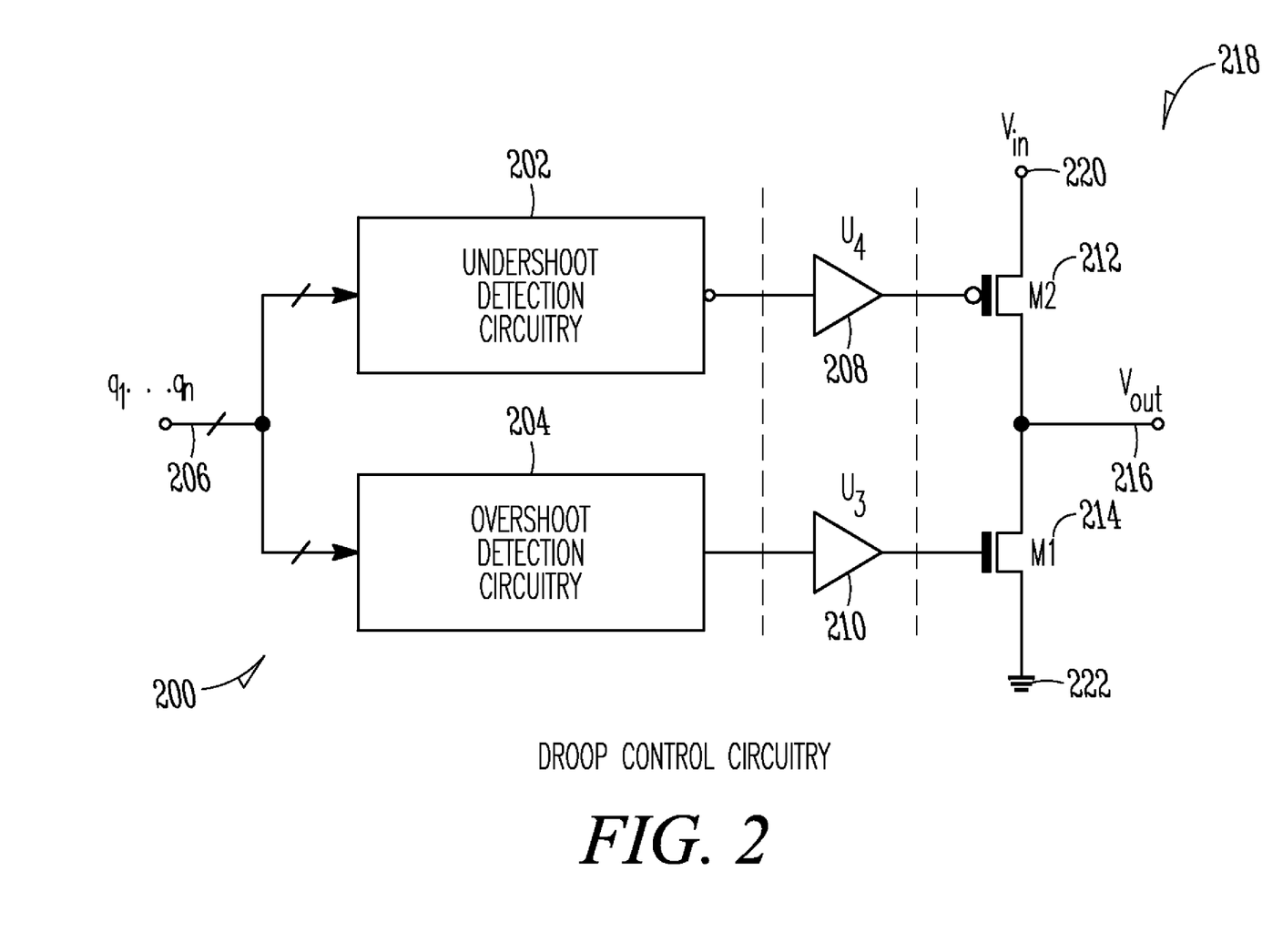
FIG. 2 is a circuit diagram of droop-control circuitry in accordance with some embodiments of the present invention.

FIG. 2 is a circuit diagram of droop-control circuitry in accordance with some embodiments of the present invention. Droop-control circuitry 200 may be suitable for use as droop-control circuitry 104 (FIG. 1), although other circuitry may also be suitable. In some embodiments, droop-control circuitry 200 may determine when multiphase switching signals 206 of a multiphase power converter are concurrently at either a high or low state and may temporarily clamp the output of the power converter to either a high or low voltage level in response thereto.

In some embodiments, droop-control circuitry 200 may include voltage-undershoot detection circuitry 202 to determine when a first predetermined number of multiphase switching signals 206 of a multiphase power converter is at a first state, and voltage-overshoot detection circuitry 204 to determine when a second predetermined number of multiphase switching signals 206 is at a second state. Multiphase switching signals 206 may correspond to multiphase switching signals 106 (FIG. 1), although the scope of the invention is not limited in this respect. In some embodiments, the first state may be a high state and the second state may be a low state, although the scope of the invention is not limited in this respect. In alternative embodiments, the first state may be a low state and the second state may be a high state.

In some embodiments, droop-control circuitry 200 may also include clamping circuitry 218 to clamp output 216 to either a high or low voltage level in response to outputs of detection circuitries 202 and 204. In some embodiments, output 216 may correspond to output 116 (FIG. 1). In some embodiments, clamping circuitry 218 may clamp output 216 to either a high or low voltage level in response to determinations made by detection circuitries 202 and 204. In some embodiments, the high voltage level may correspond to input voltage 220 of the multiphase power converter and the low voltage level may correspond to ground 222, although the scope of the invention is not limited in this respect.

In some embodiments, clamping circuitry 218 may temporarily clamp output 216 to input voltage 220 while at least a first predetermined number of multiphase switching signals 216 remains at the first state. In some embodiments, clamping circuitry 218 may further temporarily clamp output 216 to ground 222 while at least a second predetermined number of multiphase switching signals 206 remains at the second state. In some embodiments, voltage-undershoot detection circuitry 202 may count a number of multiphase switching signals 206 that are concurrently at the first state and voltage-overshoot detection circuitry 204 may count a number of multiphase switching signals 206 that are concurrently at the second state.

In some embodiments, clamping circuitry 218 may comprise first switching circuit 212 to clamp output 216 to input voltage 220 when voltage-undershoot detection circuitry 202 determines that at least the first predetermined number of multiphase switching signals is at the first state. In these embodiments, clamping circuitry 218 may also comprise second switching circuit 214 to clamp output 216 to ground 222 when voltage-overshoot detection circuitry 202 determines that at least the second predetermined number of multiphase switching signals is at the second state.

In the case of a four-phase power converter having four multiphase switching signals 206, first switching circuit 212 may clamp output 216 to input voltage 220 when, for example, four of the multiphase switching signals are concurrently high, during any time interval. Second switching circuit 214 may clamp output 216 to ground 222 when, for example, three or four of the multiphase switching signals are concurrently low, although the scope of the invention is not limited in this respect.

In the case of an eight-phase power converter having eight multiphase switching signals 206, first switching circuit 212 may clamp output 216 to input voltage 220 when, for example, six or more of the multiphase switching signals are concurrently high, although the scope of the invention is not limited in this respect. Second switching circuit 214 may clamp output 216 to ground 222 when, for example, six or more of the multiphase switching signals are concurrently low, although the scope of the invention is not limited in this respect.

In some embodiments, the number of multiphase switching signals 206 used in determining when to active clamping circuitry 218 may be set according to load and operating conditions. There is no requirement, however, that voltage-undershoot detection circuitry 202 and voltage-overshoot detection circuitry 204 trigger off the same number of multiphase switching signals.

In some embodiments, clamping circuitry 218 may clamp output 116 (FIG. 1) to either the input voltage or to ground through an inductor and/or a resistor (not illustrated), although the scope of the invention is not limited in this respect.

In some embodiments, multiphase switching signals 206 may include almost any number of phases of switching signals (e.g., $q_1, q_2, \ldots q_n$). In these embodiments, voltage-undershoot detection circuitry 202 and voltage-overshoot detection circuitry 204 may each have a number of inputs corresponding to a total number of phases of the multiphase switching signals.

In some embodiments, droop-control circuitry 200 may further comprise first buffer circuitry 208 coupled in a signal path between voltage-undershoot detection circuitry 202 and first switching circuit 212. In these embodiments, droop-control circuitry 200 may further comprise second buffer circuitry 210 coupled in a signal path between voltage-overshoot detection circuitry 204 and second switching circuit 214.

Figure 3:
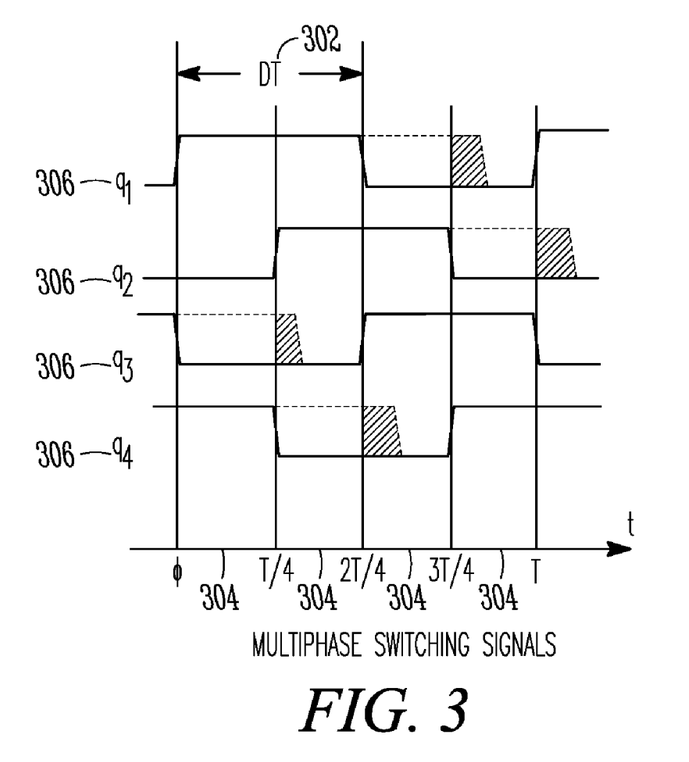
FIG. 3 illustrates multiphase switching signals in accordance with some embodiments of the present invention.

FIG. 3 illustrates multiphase switching signals in accordance with some embodiments of the present invention. Multiphase switching signals 306 ($q_1, q_2, q_3$ and $q_4$) may correspond to multiphase switching signals 106 (FIG. 1) and multiphase switching signals 206 (FIG. 2) for some embodiments of the present invention that use four multiphase switching signals.

In some embodiments, multiphase switching signals 306 may be generated by a multiphase controller, such as multiphase controller 114 (FIG. 1). In some embodiments, multiphase switching signals 306 may be shifted in phase from each other by a predetermined number of degrees and may have variable duty cycle (DT) 302. In some embodiments, duty cycle 302 may be varied or controlled by the multiphase controller based on a comparison between the power converter's output and a reference voltage.

In some embodiments, an increase in duty cycle 302 may indicate a voltage undershoot condition (i.e., a drop in the output voltage) and may result in an increase in the number multiphase switching signals having a high state. In some embodiments, a decrease in the duty cycle may indicate a voltage overshoot condition (i.e., an increase of the output voltage) and may cause an increase in the number of multiphase switching signals having a low state. During a voltage undershoot condition, the clamping circuitry may temporarily increase the output voltage by clamping the output to a higher voltage level, while during a voltage overshoot condition, the clamping circuitry may temporarily decrease the output voltage by clamping the output to a lower voltage level.

In some embodiments, clamping circuitry 218 (FIG. 2) may be triggered or activated when duty cycle 302 either increases or decreases by certain amounts. Increasing duty cycle 302 may increase the number of multiphase switching signals 206 (FIG. 2) that are in the high state during any particular time interval 304, while decreasing duty cycle 302 may increase the number of multiphase switching signals 206 (FIG. 2) that are in the low state during any particular time interval 304.

In some embodiments, when the multiphase power converter is a four-phase converter, the predetermined number of degrees that multiphase switching signals 306 may be shifted in phase from each other may be substantially ninety degrees, although the scope of the invention is not limited in this respect. In some embodiments, when the multiphase power converter is an eight-phase converter, the predetermined number of degrees may be substantially forty-five degrees, although the scope of the invention is not limited in this respect.

In some embodiments, duty cycle 302 of each of multiphase switching signals 306 may vary from approximately twenty-five percent to approximately seventy-five percent, although the scope of the invention is not limited in this respect. In other embodiments, duty cycle 302 may vary from as low as approximately zero percent to as great as approximately 100 percent, although the scope of the invention is not limited in this respect.

Although some embodiments of the present invention are described with respect to four and eight-phase power converters, the scope of the invention is not limited in this respect. For example, some embodiments of the present invention include three-phase power converters, as well as other phase number multiphase power converters.

Figure 4:
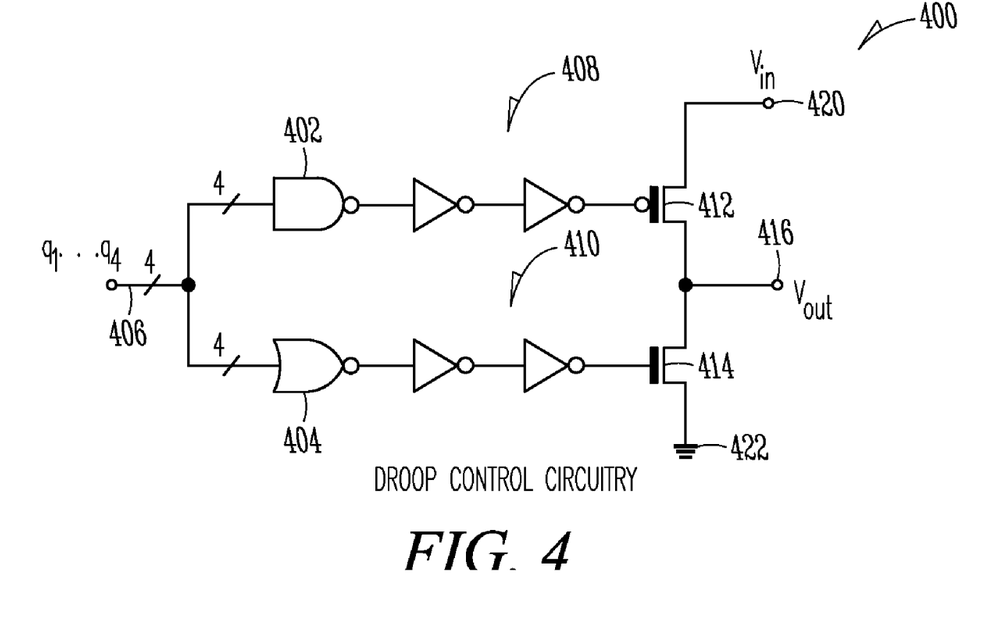
FIG. 4 is a circuit diagram of droop-control circuitry in accordance with some embodiments of the present invention.

FIG. 4 is a circuit diagram of droop-control circuitry in accordance with some embodiments of the present invention. Droop-control circuitry 400 may be suitable for use a droop-control circuitry 200 (FIG. 2) and droop-control circuitry 104 (FIG. 1) for four-phase embodiments, although the scope of the invention is not limited in this respect. Droop-control circuitry 400 may comprise first switching circuit 412 which may comprise one or more P-channel metal-oxide semiconductor (MOS) field-effect transistor (FETs). Droop-control circuitry 400 may also comprise second switching circuit 414 which may comprise one or more N-channel MOSFETs. Other types of switching elements, such as bipolar junction transistors (BJTs) and insulated gate bipolar junction transistors (IGBJTs), may also be suitable for first and second switching elements 412 and 414. In some embodiments, first and second switching circuits 412 and 414 may comprise clamping circuitry 218 (FIG. 2).

Droop-control circuitry 400 may comprise voltage-undershoot detection circuitry 402 which may comprise NAND gate circuitry. Droop-control circuitry 400 may also comprise voltage-overshoot detection circuitry 404 which may comprise NOR gate circuitry. Other circuitry, such as counters, programmable logic arrays and random logic, may also be used for determining a number of multiphase switching signals currently in a particular state.

Droop-control circuitry 400 may also comprise one or more inverters 408 in the signal path between voltage-undershoot detection circuitry 402 and switching circuit 412, and one or more inverters 410 in the signal path between voltage-overshoot detection circuitry 404 and switching circuit 414. In accordance with some embodiments, voltage-undershoot detection circuitry 402 may provide a low output when a number of multiphase switching signals 406 are concurrently at a high state indicating a possible voltage undershoot condition. The low output is provided through inverters 408 to first switching circuit 412 which may be turned on and may clamp output 416 to input voltage 420. In accordance with some embodiments, voltage-overshoot detection circuitry 404 may provide a high output when a number of multiphase switching signals 406 that are concurrently at a low state indicating a possible voltage overshoot condition. The high output is provided through inverters 410 to second switching circuit 414 which may be turned on and may clamp output 416 to ground 422.

Figure 5:
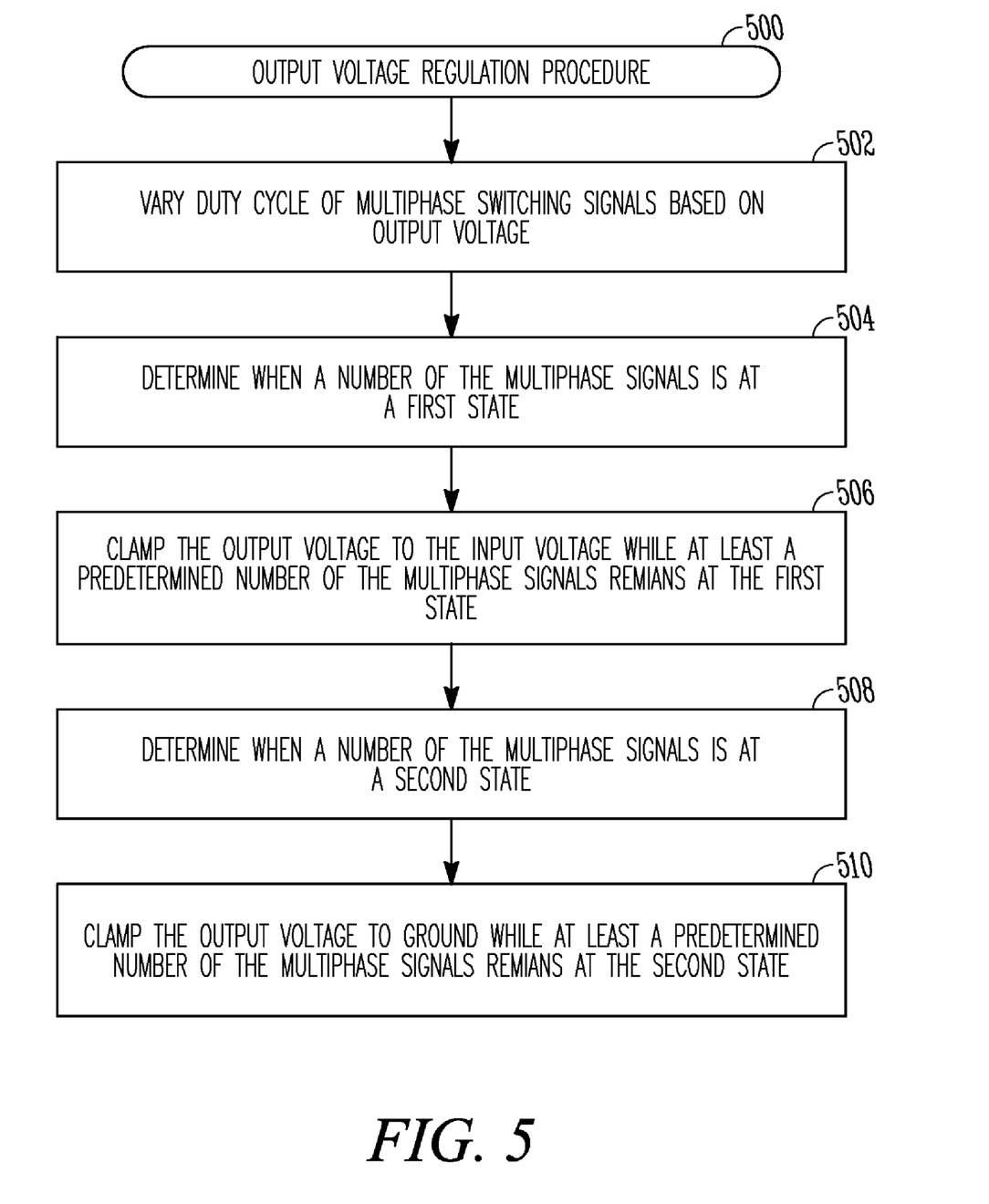
FIG. 5 is a flow chart of an output voltage regulation procedure in accordance with some embodiments of the present invention.

FIG. 5 is a flow chart of an output voltage regulation procedure in accordance with some embodiments of the present invention. Output voltage regulation procedure 500 may be performed by a multiphase power converter, such as multiphase power converter 100 (FIG. 1), although other multiphase power converters may also be suitable for performing procedure 500. Procedure 500 may be used to help reduce voltage overshoot and voltage undershoot conditions to maintain an output of a power converter within a tighter output voltage range over a wider variety of load conditions, although the scope of the invention is not limited in this respect.

Operation 502 comprises varying a duty cycle of multiphase switching signals of a multiphase power converter based on an output voltage of the multiphase power converter. A higher number of multiphase switching signals may be concurrently at a first state (e.g., high) when the duty cycle is increased, and a higher number of the multiphase switching signals may be concurrently at a second state (e.g., low) when the duty cycle is decreased. In some embodiments, operation 502 may be performed by a multiphase controller, such as multiphase controller 114 (FIG. 1).

Operation 504 comprises determining when a number of the multiphase switching signals is at a first state. In some embodiments, operation 504 may be performed by voltage-undershoot detection circuitry 202 (FIG. 2), although the scope of the invention is not limited in this respect.

Operation 506 comprises clamping an output of the multiphase power converter to a high voltage level while at least a predetermined of the multiphase switching signals is at the first state. In some embodiments, operation 506 may be performed by switching circuit 212 (FIG. 2), although the scope of the invention is not limited in this respect.

Operation 508 comprises determining when a number of the multiphase switching signals is at a second state. In some embodiments, operation 508 may be performed by voltage-overshoot detection circuitry 204 (FIG. 2), although the scope of the invention is not limited in this respect.

Operation 510 comprises clamping the output of the multiphase power converter to a low voltage level while at least a predetermined of the multiphase switching signals is at the second state. In some embodiments, operation 510 may be performed by switching circuit 214 (FIG. 2), although the scope of the invention is not limited in this respect.

Although the individual operations of procedure 500 are illustrated and described as separate operations, one or more of the individual operations may be performed concurrently, and nothing requires that the operations be performed in the order illustrated.

Figure 6:
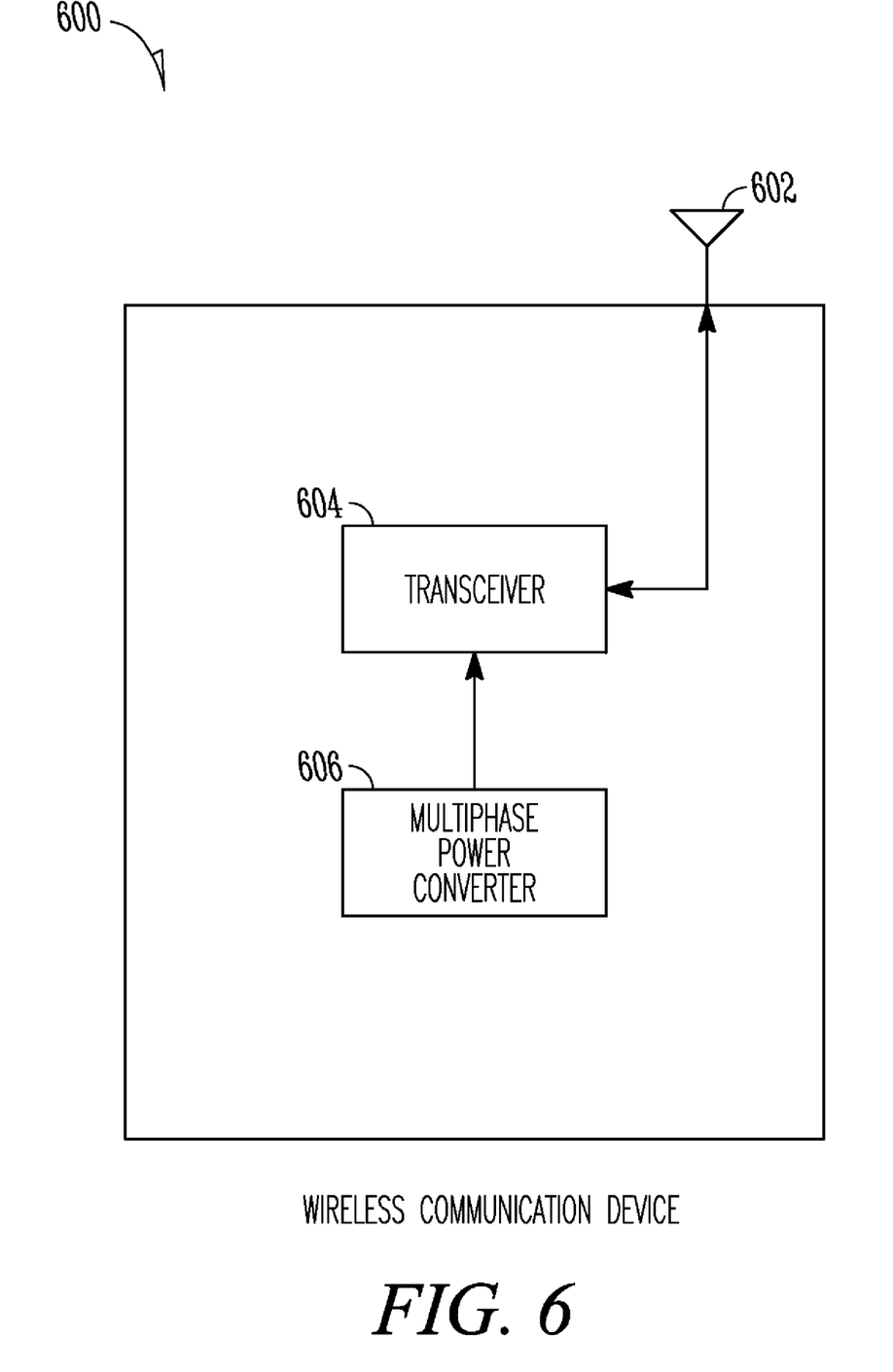
FIG. 6 is a block diagram of a wireless communication device in accordance with some embodiments of the present invention.

FIG. 6 is a block diagram of a wireless communication device in accordance with some embodiments of the present invention. Wireless communication device 600 may comprise transceiver circuitry 604 to receive and/or transmit wireless communication signals using one or more of antennas 602, and multiphase power converter 606 to supply current to the transceiver circuitry. Wireless communication device 600 may include other elements that are not illustrated for clarity. In some embodiments, transceiver 604 may be a multicarrier transceiver for communicating multicarrier communication signals. The multicarrier communication signals may include, for example, orthogonal frequency division multiplexed (OFDM) signals or discrete multitone (DMT) signals, although the scope of the invention is not limited in this respect.

In some embodiments, multiphase power converter 100 (FIG. 1) may be suitable for use as power converter 606. Antenna 602 may comprise one or more of a directional or omnidirectional antenna, including, for example, a dipole antenna, a monopole antenna, a loop antenna, a microstrip antenna or other type of antenna suitable for reception and/or transmission of RF signals.

In some embodiments, transceiver 604 may communicate packets over a wideband communication channel. The wideband channel may comprise one or more subchannels. The subchannels may be frequency-division multiplexed (i.e., separated in frequency from other subchannels) and may be within a predetermined frequency spectrum. The subchannels may comprise a plurality of orthogonal subcarriers. In some embodiments, the orthogonal subcarriers of a subchannel may be closely spaced OFDM subcarriers. To achieve orthogonality between closely spaced subcarriers, in some embodiments, the subcarriers of a particular subchannel may have null at substantially a center frequency of the other subcarriers of that subchannel.

In some embodiments, wireless communication device 600 may be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, wireless communication device 600 may transmit and/or receive RF communications in accordance with specific communication standards, such as the Institute of Electrical and Electronics Engineers (IEEE) standards including IEEE 802.11(a), 802.11(b), 802.11(g/h) and/or 802.11 (n) standards for wireless local area networks (WLANs) and/or 802.16 standards for wireless metropolitan area networks (WMANs), although device 600 may also be suitable to transmit and/or receive communications in accordance with other techniques including the Digital Video Broadcasting Terrestrial (DVB-T) broadcasting standard, and the High performance radio Local Area Network (HiperLAN) standard.

Although communication device 600 is illustrated as a wireless communication device, device 600 may be almost any wireless or wireline communication device, including a general purpose processing or computing system. In some embodiments, device 600 may be a battery-powered device. In some of these embodiments, device 600 may not require antenna 602.

Figure 7:
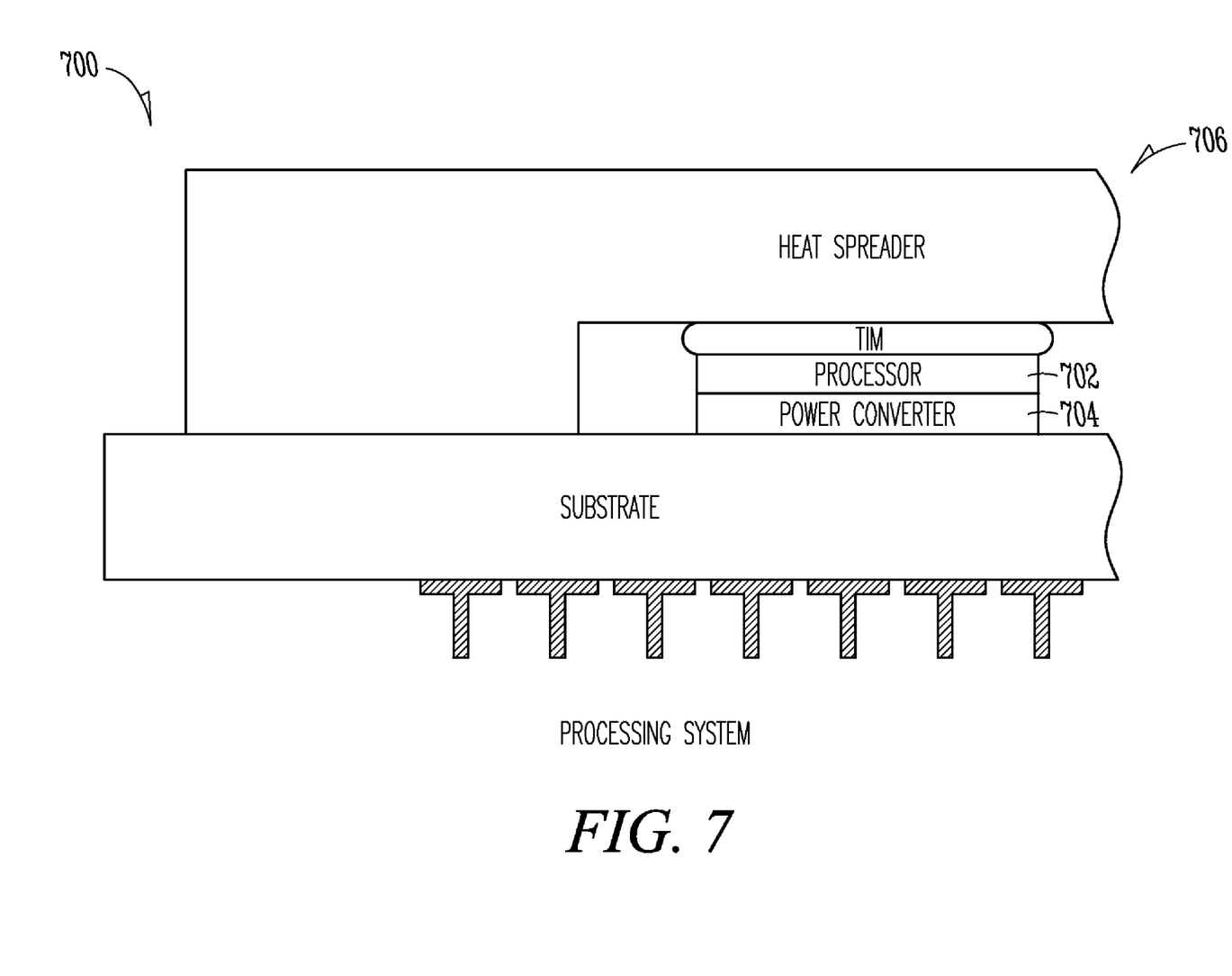
FIG. 7 illustrates a processing system in accordance with some embodiments of the present invention.

FIG. 7 illustrates a processing system in accordance with some embodiments of the present invention. Processing system 700 may comprise processor 702 and power converter 704. Power converter 704 may be a DC-to-DC multiphase power converter to supply current to processor 702. In some embodiments, power converter 100 (FIG. 1) may be suitable for use as power converter 704. In some embodiments, power converter 704 and processor 702 may be fabricated on the same die. In some embodiments, power converter 704 and processor 702 may be fabricated on separate die and located within a single package, such as package 706. In some embodiments, power converter 704 and processor 702 may be fabricated on separate die and stacked within a single package as illustrated in the example of FIG. 7. In some embodiments, power converter 704 and processor 702 may be fabricated on separate die and located within a multichip module. In some embodiments, a motherboard may comprise power converter 704 and processor 702 separately located thereon.

Although multiphase power converter 100 (FIG. 1) is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. Droop-control circuitry for a multiphase power converter comprising:
   voltage-undershoot detection circuitry to determine a number of multiphase switching signals of a multiphase power converter at a first state;
   voltage-overshoot detection circuitry to determine a number of the multiphase switching signals at a second state; and
   clamping circuitry,
   wherein voltage-undershoot detection circuitry provides an output to the clamping circuitry when the number of multiphase switching signals at the first state exceeds a first predetermined number causing the clamping circuitry to temporarily clamp an output of the power converter to a high voltage level, and
   wherein voltage-overshoot detection circuitry provides an output to the clamping circuitry when the number of multiphase switching signals at the second state exceeds a second predetermined number causing the clamping circuitry to temporarily clamp the output of the power converter to a low voltage level.

2. The circuitry of claim 1 wherein the high voltage level corresponds to an input voltage of the multiphase power converter and the low voltage level corresponds to a ground, and
   wherein the clamping circuitry temporarily clamps the output of the multiphase power converter to the input voltage while the number of multiphase switching signals at the first state exceeds the first predetermined number, and
   wherein the clamping circuitry temporarily clamps the output of the multiphase power converter to the ground while the number of multiphase switching signals at the second state exceeds the second predetermined number.

3. The circuitry of claim 1 wherein the voltage-undershoot detection circuitry comprises logic circuitry to count the multiphase switching signals that are concurrently at the first state to determine the number of multiphase signals at the first state, and
   wherein the voltage-overshoot detection circuitry comprises logic circuitry to count the multiphase switching signals that are concurrently at the second state to determine the number of multiphase signals at the second state.

4. The circuitry of claim 1 wherein the clamping circuitry comprises:

a first switching circuit to clamp the output of the multiphase power converter to an input voltage when the voltage-undershoot detection circuitry determines that the number of multiphase switching signals at the first state exceeds the first predetermined number; and
a second switching circuit to clamp the output of the multiphase power converter to a ground voltage when the voltage-overshoot detection circuitry determines that the number of multiphase switching signals at the second state exceeds the second predetermined number.

5. The circuitry of claim 4 wherein the voltage-undershoot detection circuitry and the voltage-overshoot detection circuitry each have inputs corresponding to a total number of phases of the multiphase switching signals.

6. The circuitry of claim 1 wherein the multiphase switching signals comprise components that are shifted in phase from each other by a predetermined number of degrees and have a variable duty cycle, the duty cycle being varied based on the output.

7. The circuitry of claim 6 wherein the multiphase power converter is a four-phase converter and the predetermined number of degrees is substantially ninety.

8. The circuitry of claim 6 wherein the multiphase power converter is an eight-phase converter and the predetermined number of degrees is substantially forty-five.

9. Droop-control circuitry for a multiphase power converter comprising:
   voltage-undershoot detection circuitry to determine when a first predetermined number of multiphase switching signals of a multiphase power converter is at a first state;
   voltage-overshoot detection circuitry to determine when a second predetermined number of the multiphase switching signals is at a second state; and
   clamping circuitry to clamp an output of the multiphase power converter to either a high or low voltage level in response to outputs of the detection circuitries,
   wherein the clamping circuitry comprises:
   a first switching circuit to clamp the output of the multiphase power converter to an input voltage when the voltage-undershoot detection circuitry determines that at least the first predetermined number of multiphase switching signals is at the first state; and
   a second switching circuit to clamp the output of the multiphase power converter to a ground voltage when the voltage-overshoot detection circuitry determines that at least the second predetermined number of multiphase switching signals is at the second state,
   wherein the first switching circuit comprises a P-channel metal-oxide semiconductor (MOS) field-effect transistor (FET) and the second switching circuit comprises an N-channel MOSFET,
   wherein the voltage-undershoot detection circuitry comprises NAND gate circuitry, and
   wherein the voltage-overshoot detection circuitry comprises NOR gate circuitry,
   wherein the first state is a high state, and
   wherein the second state is a low state.

10. Droop-control circuitry for a multiphase power converter comprising:
   voltage-undershoot detection circuitry to determine when a first predetermined number of multiphase switching signals of a multiphase power converter is at a first state;
   voltage-overshoot detection circuitry to determine when a second predetermined number of the multiphase switching signals is at a second state; and clamping circuitry to clamp an output of the multiphase power converter to either a high or low voltage level in response to outputs of the detection circuitries, wherein the clamping circuitry comprises:

a first switching circuit to clamp the output of the multiphase power converter to an input voltage when the voltage-undershoot detection circuitry determines that at least the first predetermined number of multiphase switching signals is at the first state; and a second switching circuit to clamp the output of the multiphase power converter to a ground voltage when the voltage-overshoot detection circuitry determines that at least the second predetermined number of multiphase switching signals is at the second state, wherein the voltage-undershoot detection circuitry and the voltage-overshoot detection circuitry each have inputs corresponding to a total number of phases of the multiphase switching signals, wherein the droop-control circuitry further comprises:

first buffer circuitry coupled in a signal path between the voltage-undershoot detection circuitry and the first switching circuit; and second buffer circuitry coupled in a signal path between the voltage-overshoot detection circuitry and the second switching circuit.

11. A multiphase power converter comprising:

droop-control circuitry; and multiphase power converter circuitry, wherein the droop-control circuitry comprises:

voltage-undershoot detection circuitry to determine when a number of multiphase switching signals is at a first state;

voltage-overshoot detection circuitry to determine when a number of the multiphase switching signals is at a second state; and clamping circuitry, and wherein multiphase power converter circuitry comprises a plurality of bridge circuits to cumulatively generate the output from an input voltage in response to the multiphase switching signals, wherein voltage-undershoot detection circuitry provides an output to the clamping circuitry when the number of multiphase switching signals at the first state exceeds a first predetermined number causing the clamping circuitry to temporarily clamp an output of the power converter to a high voltage level, and wherein voltage-overshoot detection circuitry provides an output to the clamping circuitry when the number of multiphase switching signals at the second state exceeds a second predetermined number causing the clamping circuitry to temporarily clamp the output of the power converter to a low voltage level.

12. The power converter of claim 11 further comprising a multiphase controller to generate the multiphase switching signals and to control a duty cycle of the multiphase switching signals based on the output of the power converter and a reference voltage, wherein the duty cycle is increased when a higher number of the multiphase switching signals are concurrently at the first state, and wherein the duty cycle is decreased when a higher number of the multiphase switching signals are concurrently at the second state.

13. The power converter of claim 12 wherein each of the bridge circuits is coupled with an associated output inductor to cumulatively generate the output of the power converter, and wherein each of the bridge circuits and the associated output inductor comprise a Buck converter.

14. The power converter of claim 11 wherein the high voltage level corresponds to an input voltage of the multiphase power converter and the low voltage level corresponds to a ground, and wherein the clamping circuitry temporarily clamps the output of the multiphase power converter to the input voltage while the number of the multiphase switching signals at the first state exceeds the first predetermined number, and wherein the clamping circuitry further temporarily clamps the output of the multiphase power converter to the ground while the number of the multiphase switching signals at the second state exceeds the second predetermined number.

15. The power converter of claim 11 wherein the voltage-undershoot detection circuitry comprises logic circuitry to count the multiphase switching signals that are concurrently at the first state to determine the number of multiphase signals at the first state, and wherein the voltage-overshoot detection circuitry comprises logic circuitry to count the multiphase switching signals that are concurrently at the second state to determine the number of multiphase signals at the second state.

16. The power converter of claim 11 wherein the clamping circuitry comprises:

a first switching circuit to clamp the output of the multiphase power converter to an input voltage in response to the output from the voltage-undershoot detection circuitry ; and a second switching circuit to clamp the output of the multiphase power converter to a ground voltage in response to the output from the voltage-overshoot detection circuitry.

17. A method comprising:

determining when a number of multiphase switching signals of a multiphase power converter is at a first state;

determining when the number of the multiphase switching signals is at a second state; and clamping an output of the multiphase power converter to a high voltage level when the number of multiphase switching signals at the first state exceed a first number; and clamping the output of the multiphase power converter to a low voltage when the number of multiphase switching signals at the second state exceeds a second number.

18. The method of claim 17 wherein the high voltage level corresponds to an input voltage and the low voltage level corresponds to a ground, and wherein clamping comprises temporarily clamping the output to the input voltage while the number of multiphase switching signals at the first state exceed the first number, and wherein clamping further comprises temporarily clamping the output to the ground while the number of multiphase switching signals at the second state exceed the second number.

19. The method of claim 17 wherein determining and comprises counting the multiphase switching signals that are concurrently at the first state, and counting the multiphase switching signals that are concurrently at the second state.

20. The method of claim 17 wherein the method is performed by a multiphase power converter, the method further comprising varying a duty cycle of the multiphase switching signals based on an output voltage of the multiphase power converter, wherein the duty cycle is increased when a higher number of the multiphase switching signals are concurrently at the first state, and wherein the duty cycle is decreased when a higher number of the multiphase switching signals are concurrently at the second state.

21. Circuitry comprising:

detection circuitry to determine when a predetermined number of components of a multiphase switching signal of a multiphase power converter is at a particular state by counting phases of the components that are concurrently at either a first state or a second state; and clamping circuitry to clamp an output of the multiphase power converter to a voltage level in response to the detection circuitry.

22. The circuitry of claim 21 wherein the clamping circuitry clamps the output of the multiphase power converter to a higher voltage level when the detection circuitry detects a voltage undershoot condition based on the number of phases of the components at the first state, and wherein the clamping circuitry clamps the output of the multiphase power converter to a lower voltage level when the detection circuitry detects a voltage overshoot condition based on the number of phases of the components at the second state.

23. The circuitry of claim 22 wherein the detection circuitry counts the components that are concurrently at either the first state or the second state to determine whether either a voltage undershoot condition or voltage undershoot condition exists.

* * * * *

UNITED STATES PATENT AND TRADEMARK OFFICE
CERTIFICATE OF CORRECTION

| | | |
|---|---|---|
| PATENT NO. | : 7,274,181 B2 | Page 1 of 1 |
| APPLICATION NO. | : 10/877939 | |
| DATED | : September 25, 2007 | |
| INVENTOR(S) | : Schrom et al. | |

It is certified that error appears in the above-identified patent and that said Letters Patent is hereby corrected as shown below:

In column 12, line 32, in Claim 16, delete "circuitry ;" and insert -- circuitry; --, therefor.

Signed and Sealed this

Twenty-fifth Day of December, 2007

JON W. DUDAS
*Director of the United States Patent and Trademark Office*